(12) United States Patent
Luan et al.

(10) Patent No.: US 12,459,041 B2
(45) Date of Patent: Nov. 4, 2025

(54) POROSITY PREDICTION

(71) Applicant: Peridot Print LLC, Palo Alto, CA (US)

(72) Inventors: He Luan, Palo Alto, CA (US); Jun Zeng, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 426 days.

(21) Appl. No.: 17/774,800

(22) PCT Filed: Dec. 5, 2019

(86) PCT No.: PCT/US2019/064723
§ 371 (c)(1),
(2) Date: May 5, 2022

(87) PCT Pub. No.: WO2021/112859
PCT Pub. Date: Jun. 10, 2021

(65) Prior Publication Data
US 2022/0388070 A1    Dec. 8, 2022

(51) Int. Cl.
*B22F 12/90*     (2021.01)
*B22F 3/11*      (2006.01)
*G06F 30/27*     (2020.01)

(52) U.S. Cl.
CPC ............ *B22F 12/90* (2021.01); *B22F 3/1121* (2013.01); *G06F 30/27* (2020.01)

(58) Field of Classification Search
CPC .... B21D 22/022; B21D 22/21; B21D 35/007; B21D 39/031; B21D 53/88; B23K 2101/006; B32B 15/011; B32B 15/013; B32B 2250/02; B32B 2307/732; B32B 2605/08; B32B 3/04; B32B 3/085; B32B 3/28; B32B 7/08; C21D 2211/008; C21D 9/46; C23C 2/06; C23C 2/20
See application file for complete search history.

(56) References Cited

U.S. PATENT DOCUMENTS

| | | |
|---|---|---|
| 5,653,925 A | 8/1997 | Batchelder |
| 7,323,634 B2 | 1/2008 | Speakman |
| 9,522,426 B2 | 12/2016 | Das et al. |
| 2017/0203515 A1 | 7/2017 | Bennett et al. |
| 2017/0355146 A1 | 12/2017 | Buller et al. |
| 2018/0093419 A1 | 4/2018 | Lappas et al. |
| 2018/0341248 A1 | 11/2018 | Mehr et al. |
| 2019/0054700 A1 | 2/2019 | Chandar et al. |
| 2019/0384274 A1* | 12/2019 | Bharadwaj ......... G05B 19/4099 |

FOREIGN PATENT DOCUMENTS

| | | | |
|---|---|---|---|
| CN | 109808183 A | 5/2019 | |
| WO | WO-2019067471 A2 * | 4/2019 | ............. G06F 17/50 |

OTHER PUBLICATIONS

In-Process monitoring of porosity during laser additive manufacturing Process Additive Manufacturing 28 (2019) 497-505 (Year: 2019).*

* cited by examiner

*Primary Examiner* — Jenny R Wu
(74) *Attorney, Agent, or Firm* — Shook, Hardy & Bacon

(57) ABSTRACT

Examples of methods for predicting porosity are described herein. In some examples, a method includes predicting a height map. In some examples, the height map is of material for metal printing. In some examples, the method includes predicting a porosity of a precursor object. In some examples, predicting the porosity of the precursor object is based on the predicted height map.

10 Claims, 6 Drawing Sheets

100

POROSITY PREDICTION

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike traditional machining processes that often remove material to create the final part. In some additive manufacturing techniques, the build material may be cured or fused.

DETAILED DESCRIPTION

Figure 1:
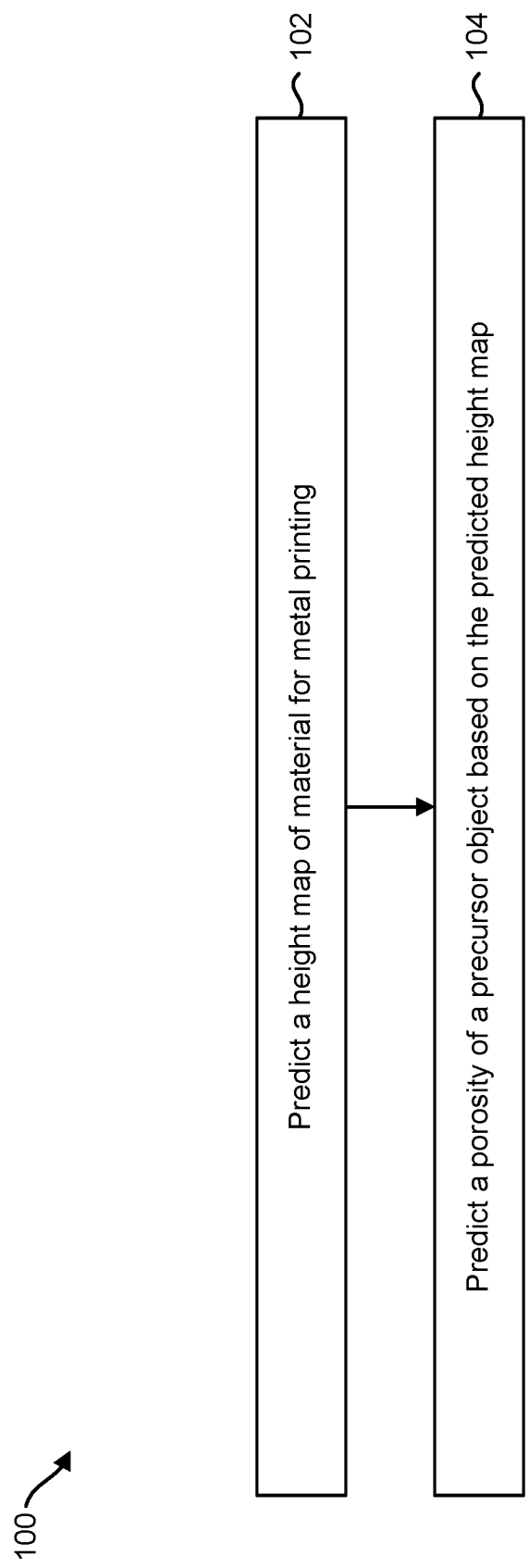
FIG. 1 is a flow diagram illustrating an example of a method for porosity prediction.

Additive manufacturing may be used to manufacture three-dimensional (3D) objects. 3D printing is an example of additive manufacturing. Metal printing (e.g., metal binding printing, Metal Jet Fusion, etc.) is an example of 3D printing. In some examples, metal powder may be glued at certain voxels. A voxel is a representation of a location in a 3D space (e.g., a component of a 3D space). For instance, a voxel may represent a volume that is a subset of the 3D space. In some examples, voxels may be arranged on a 3D grid. For instance, a voxel may be cuboid or rectangular prismatic in shape. In some examples, voxels in the 3D space may be uniformly sized or non-uniformly sized. Examples of a voxel size dimension may include 25.4 millimeters (mm)/150≈170 microns for 150 dots per inch (dpi), 490 microns for 50 dpi, 2 mm, 4 mm, etc. The term "voxel level" and variations thereof may refer to a resolution, scale, or density corresponding to voxel size.

Some examples of the techniques described herein may be utilized for various examples of additive manufacturing. For instance, some examples may be utilized for metal printing. Some metal printing techniques may be powder-based and driven by powder gluing and/or sintering. Some examples of the approaches described herein may be applied to area-based powder bed metal printing, such as Metal Jet Fusion and/or metal binding printing, etc. Some examples of the approaches described herein may be applied to additive manufacturing where an agent or agents (e.g., latex) carried by droplets are utilized for voxel-level powder binding.

In some examples, metal printing may include two stages. In a first stage, the printer (e.g., print head, carriage, agent dispenser, and/or nozzle, etc.) may apply an agent or agents (e.g., binding agent, glue, latex, etc.) to loose metal powder layer-by-layer to produce a glued precursor (or "green") object. A precursor object is a mass of metal powder and adhesive. In a second stage, a precursor part may be sintered (e.g., heated) to produce an end object. For example, the glued precursor object may be placed in a furnace to be sintered to produce the end object. Sintering may cause the metal powder to melt and fuse, and/or may cause the agent to be burned off. An end object is an object formed from a manufacturing procedure or procedures. In some examples, an end object may undergo a further manufacturing procedure or procedures (e.g., support removal, polishing, assembly, painting, finishing, etc.). A precursor object may have an approximate shape of an end object.

The two stages of some examples of metal printing may present challenges in controlling the shape (e.g., geometry) of the end object. For example, the application (e.g., injection) of agent(s) (e.g., glue, latex, etc.) may lead to porosity in the precursor part, which may significantly influence the shape of the end object. In some examples, metal powder fusion (e.g., fusion of metal particles) may be separated from the layer-by-layer printing procedure, which may limit control over sintering and/or fusion.

Some examples of the techniques described herein may improve control of the end object shape. For example, a machine learning model or machine learning models (e.g., deep learning, artificial neural networks, etc.) may be utilized to enable prediction of and compensation for the end object shape (e.g., geometry) in metal printing. For instance, some techniques may enable prediction of the end object shape before and/or during manufacturing. Compensation may include adjusting data and/or manufacturing to reduce and/or avoid deformation of the end object.

A machine learning model is a structure that learns based on training. Examples of machine learning models may include artificial neural networks (e.g., deep neural networks, convolutional neural networks (CNNs), convolutional long short-term memory (Conv-LSTM) neural networks, etc.). Training the machine learning model may include adjusting a weight or weights of the machine learning model. For example, a neural network may include a set of nodes, layers, and/or connections between nodes. The nodes, layers, and/or connections may have associated weights. The weights may be adjusted to train the neural network to perform a function, such as predicting object shape (e.g., geometry). Some examples of the techniques described herein may utilize a machine learning model or models to predict a height map, to predict a porosity, and/or to predict a shape of an object.

In some examples, prediction and/or compensation may be performed in an offline loop and/or an online loop. An offline loop is a procedure that is performed independent of (e.g., before) manufacturing. An online loop is a procedure that is performed in conjunction with (e.g., during) manufacturing. In some examples, an offline loop may be performed before manufacturing for prediction and/or compensation. In some examples, an online loop may be performed during manufacturing for prediction and/or compensation. In some examples, an offline loop may be performed before manufacturing and an online loop may be performed during manufacturing. For instance, prediction and compensation for the end object geometry in metal printing may be performed in both offline and online loops.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

FIG. 1 is a flow diagram illustrating an example of a method 100 for porosity prediction. The method 100 and/or an element or elements of the method 100 may be performed by an apparatus (e.g., electronic device). For example, the method 100 may be performed by the apparatus 302 described in connection with FIG. 3.

The apparatus may predict 102 a height map of material for metal printing. A height map is a set of data indicating the height or heights of material. For example, a height map may indicate the variation in height of material in a build volume. A build volume is a 3D space for object manufacturing. For example, a build volume may be a cuboid space in which an apparatus (e.g., computer, 3D printer, etc.) may deposit material (e.g., metal powder, metal particles, etc.) and agent(s) (e.g., glue, latex, etc.) to manufacture an object. In some examples, an apparatus may progressively fill a build volume layer-by-layer with material and agent during manufacturing. A height map may indicate the height of the material, which may vary over a span (e.g., horizontal span or layer) of the build volume. The height map may be expressed as height from the base or bottom of the build volume. For example, material in a build volume may be expressed in three coordinates: X (e.g., width), Y (e.g., depth), and Z (e.g., height). In some examples, the height map may be expressed as values in the Z dimension over coordinates in the X and Y dimensions. In some examples, predicting 102 the height map may be based on sensed height data, slice data, and/or agent map(s).

In some examples, predicting 102 the height map may be based on a height prediction machine learning model. The height prediction machine learning model may be utilized to predict the height map based on an agent map or agent maps. An agent map is data indicating a location or locations for applying an agent or agents. For example, an agent map may correspond to a slice or layer of a 3D object model and/or build volume. The agent map may indicate pixels or voxels (e.g., locations, areas, etc.) for a printer to apply agent(s) for a layer of the 3D object model and/or a layer of the build volume. In some examples, the height prediction machine learning model may be utilized to predict the height map (e.g., Z-height) for a layer or layers after printing. For instance, the predicted 102 height map may indicate a height of material in the build volume after agent application and/or material distribution (e.g., spreading).

In some examples, the height prediction machine learning model may be utilized to predict 102 the height map based on sensed height data (e.g., runtime height sensing). Sensed height data is data from a sensor or sensors that indicates material height. For example, sensed height data may indicate material height of a top layer of material in a build volume. Some examples of sensors that may be utilized to obtain sensed height data may include stereoscopic cameras, depth sensors, light detection and ranging (LIDAR) sensors, time-of-flight (TOF) cameras, etc. For instance, a printer may include an in-situ sensor or sensors for measuring sensed height data. In some examples, in-situ stereoscopic cameras may be utilized to obtain 3D build surface measurements, where the X and Y dimensions may represent horizontal pixel locations, and the Z dimension may represent the measured height. In some examples, sensed height data (from previous prints or builds, for instance) may be utilized to train a machine learning model. In some examples, sensed height data may be utilized as an input for height map prediction.

In some examples, the height prediction machine learning model may be trained with sensed height data, agent map(s), slice(s), and/or 3D object model data. For instance, the height prediction machine learning model may be trained with sensed height data and agent maps to predict height maps. In some examples, the height prediction machine learning model may predict 102 a height map based on an agent map. For instance, offline height map prediction may be performed based on agent maps (when online sensed height data may not be available, for example). In some examples, the height prediction machine learning model may predict 102 a height map based on sensed height data. For example, the height prediction machine learning model may predict 102 a height map based on an agent map for a current layer and sensed height data from a previously printed layer. For instance, online height map prediction may be performed based on agent maps and sensed height data (when online sensed height data is available, for example). The height prediction machine learning model may utilize agent maps and runtime sensed height data as inputs to output a predicted height map of each layer.

The apparatus may predict 104 a porosity of a precursor object based on the predicted height map. Porosity is an indicator of a degree of porousness of a mass. For example, porosity may indicate a proportion of a volume of a precursor object that is metal. For instance, a portion of the volume may include metal, and a portion of the volume may include agent and/or air. The porosity may indicate a proportion of the precursor object that is metal versus agent and/or air. In some examples, porosity may be expressed as a 3D field, where porosity may vary over the field (e.g., over a volume of a precursor object). For instance, porosity may be expressed as a set of porosity values (e.g., numbers) corresponding to locations (e.g., voxels) over the 3D field. For example, each of the porosity values (e.g., numbers) may be a scalar associated with a voxel that describes a percentage of the void of the voxel. Porosity values may vary from voxel to voxel. Material height (e.g., predicted height map and/or sensed height data) may reflect the porosity of the precursor object. For example, material height may relate to the porosity of the precursor object. For instance, greater material height at a location may correlate to increased porosity at the location because regions of greater height in the build volume may include proportionally more agent.

In some examples, predicting 104 the porosity may be based on a porosity prediction machine learning model. The porosity prediction machine learning model may be utilized to predict the porosity based on a predicted height map or height maps. For instance, each predicted height map may correspond to a layer (e.g., a slice, a layer of material, etc.). In some examples, the porosity prediction machine learning model may utilize each available predicted height map (corresponding to a current layer and a previously printed layer or layers, for instance). In some examples, the porosity prediction machine learning model may be utilized to predict the porosity of a precursor object. For instance, the predicted 104 porosity may indicate porosity within a volume of the precursor object.

In some examples, the apparatus may provide the predicted porosity. For instance, the apparatus may store the predicted porosity, may send the predicted porosity to another device, and/or may present the predicted porosity (on a display and/or in a user interface, for example). In some examples, the apparatus may utilize the predicted porosity to compensate for potential object deformations. For instance, the apparatus may adjust the 3D object model (e.g., CAD model) and/or printing variables (e.g., amount of agent, thermal exposure time, etc.) to reduce or avoid potential deformations. In some approaches, the apparatus may perform iterative compensation. For instance, the apparatus may predict end object shape (e.g., deformation), may adjust the 3D object model (e.g., the placement of a fusing voxel or voxels or agent), and may repeat predicting end object shape using the adjusted 3D model. Adjustments that reduce predicted object deformation may be retained and/or amplified. Adjustments that increase predicted object deformation may be reversed and/or reduced. This procedure may iterate until the predicted deformation is reduced to a target amount. In some examples, a 3D printer may print the compensated (e.g., deformation-reduced and/or improved) 3D model.

Figure 2:
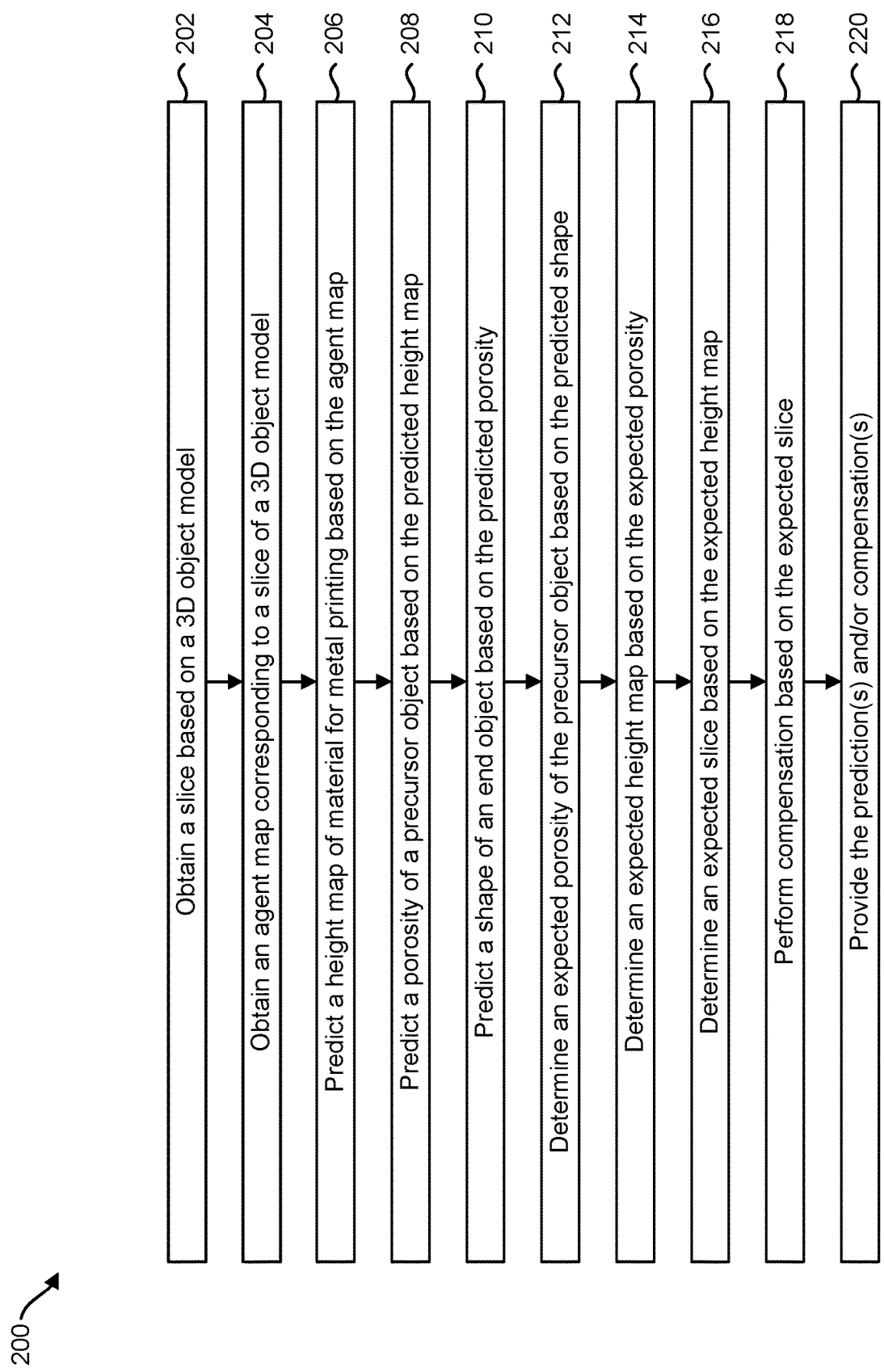
FIG. 2 is a flow diagram illustrating an example of a method for predicting object deformation.

FIG. 2 is a flow diagram illustrating an example of a method 200 for predicting object deformation. The method 200 and/or an element or elements of the method 200 may be performed by an apparatus (e.g., electronic device). For example, the method 200 may be performed by the apparatus 302 described in connection with FIG. 3.

The apparatus may obtain 202 a slice or slices based on a 3D object model. A 3D object model is a 3D geometrical model of an object. Examples of 3D object models include computer-aided design (CAD) models, mesh models, 3D surfaces, etc. In some examples, a 3D object model may be utilized to manufacture (e.g., print) an object. In some examples, the apparatus may receive a 3D object model from another device (e.g., linked device, networked device, removable storage, etc.) or may generate the 3D object model.

In some examples, the apparatus may slice the 3D object model to obtain 202 the slice(s). For example, slicing may include generating a set of two-dimensional (2D) slices corresponding to the 3D object model. In some approaches, the 3D object model may be traversed along an axis (e.g., a vertical axis, Z-axis, or other axis), where each slice represents a 2D cross section of the 3D object model. For example, slicing the 3D model may include identifying a Z-coordinate of a slice plane. The Z-coordinate of the slice plane can be used to traverse the 3D model to identify a portion or portions of the 3D model intercepted by the slice plane.

In some examples, the apparatus may obtain 202 the slice(s) by receiving a slice or slices from another device. For instance, the apparatus may receive the slice(s) from another device over a wired or wireless link (e.g., network, Internet, etc.) and/or from removable storage (e.g., flash drive, external drive, etc.).

In some examples, the apparatus may obtain a slice or slices of a build geometry. A build or build geometry is data representing a 3D object model or models in a build volume. For instance, a build geometry may represent a build volume after packing a 3D object model or models. The apparatus may slice the build geometry and/or may receive slice(s) corresponding to a build geometry.

The apparatus may obtain 204 an agent map or maps corresponding to a slice or slices of the 3D object model. For example, the apparatus may utilize a 3D model and/or a slice or slices to generate the agent map(s). Agent maps may be examples of per-layer machine instructions. In some examples, agent map generation may be performed based on the slices. For example, an agent map or agent maps may be generated for each slice. For instance, obtaining 204 an agent map may include generating an agent map that indicates an area or areas for printing agent (e.g., binding agent, glue, latex, etc.) for a layer. The agent map or maps may be represented in a variety of formats in some examples. For instance, an agent map may be represented as an image file, a 2D grid, or a 2D array of values that indicate locations (e.g., pixels or voxels) for printing the agent.

In some examples, the apparatus may obtain 204 the agent map(s) by receiving an agent map or agent maps from another device. For instance, the apparatus may receive the agent map(s) from another device over a wired or wireless link (e.g., network, Internet, etc.) and/or from removable storage (e.g., flash drive, external drive, etc.).

In some examples, the apparatus may obtain an agent map or maps corresponding to a build geometry. The apparatus may generate the agent map(s) from the slice(s) of the build geometry and/or may receive agent map(s) corresponding to a build geometry.

In some examples, the apparatus may obtain 202 the slices individually or in a batch. In some examples, the apparatus may obtain 204 the agent maps individually or in a batch. For instance, in an online printing procedure (e.g., in a layer-by-layer printing procedure), the apparatus may obtain 202 the slice and may obtain 204 the agent map for each layer. In an offline procedure (e.g., before printing), the apparatus may obtain 202 the slice and may obtain 204 the agent map for all layers.

The apparatus may predict 206 a height map of material for metal printing based on the agent map or agent maps. In some examples, predicting 206 the height map may be performed based on sensed height data, slice data, and/or agent map(s). In some examples, predicting 206 the height map may be accomplished as described in relation to FIG. 1. In some examples, the apparatus may utilize a height prediction machine learning model to predict 206 the height map based on the agent map. In some examples, the apparatus may utilize a height prediction machine learning model to predict 206 the height map based on the agent map and sensed height data.

In some examples, the height prediction machine learning model may be a convolutional long short-term memory (Conv-LSTM) model-based sequential model. For example, there may be two factors or influencers for the height of each layer: (1) the height of the build before the current layer and (2) the agent map(s) that drives or drive object geometry of the current layer. For instance, the injection of latex agents may lead to the variation of heights in the build volume. The variation of the height in previously printed layers may influence the amount of metal powder spread, and may therefore further influence the height. Thus, the height factors or influencers may be sequential, and the Conv-LSTM model may be utilized to model the height.

The height prediction machine learning model may be trained differently to serve different applications and/or use-cases. In some examples, the sensed height data after spreading a current layer, slice data, and/or the agent map(s) of the current layer may be utilized as input to predict the height map of a precursor object (after printing the layer, for example). For instance, the height prediction model may predict the precursor object printing process, and the height prediction model may be utilized for geometric compensation. In some examples, the predicted height map may be a height map for a subsequent layer (e.g., a layer subsequent to a layer of the sensed height data).

In some examples, the sensed height data after the print of the previous layer may be utilized to predict the height map after spreading the current layer. The height prediction model may predict the powder spread process. In some examples, slice data and/or an agent map or maps may be utilized to predict the height map.

In some examples of an online procedure, before the printing of each layer, the apparatus may use an agent map or maps of a current layer and runtime sensed height data, slice data, and/or agent map(s) as input and may utilize the height prediction machine learning model to predict 206 the height map of the layer. The height map prediction may be a prediction of the layer after it is printed. In some examples of an offline procedure, for each layer, the apparatus may use an agent map or maps and the height prediction machine learning model to predict 206 the height map of the layer. The height map prediction may be a prediction of the layer after it is printed.

The apparatus may predict 208 a porosity of a precursor object based on the predicted height map. In some examples, predicting 208 the porosity of a precursor object may be accomplished as described in relation to FIG. 1. In some examples, the apparatus may utilize a porosity prediction machine learning model to predict 208 the porosity of a precursor object based on the predicted height map (e.g., the predicted height maps of all layers printed so far in some approaches). In some examples, the porosity prediction machine learning model may be a deep learning model to predict the height map (or height distribution). In some examples, porosity at each voxel may be computed based on a height map. For a voxel, for instance, a peak of the height map may describe the powder content in the voxel and/or the valley of the height map may describe a void. Integrating the height map over a voxel area in two dimensions (e.g., X and Y) and dividing by voxel volume may produce the porosity value for the voxel. In some examples of an online procedure, the apparatus may use a predicted height map or height maps for a layer or layers up to a current layer and the porosity prediction machine learning model to predict 208 the porosity of a precursor object. In some examples of an offline procedure, the apparatus may use predicted height maps for all of the layers and the porosity prediction machine learning model to predict 208 the porosity of a precursor object (and/or for a whole build, for instance).

The apparatus may predict 210 a shape of an end object based on the predicted porosity. A shape of an end object is data that indicates the geometry of the end shape. In some examples, the apparatus may utilize a shape prediction machine learning model to predict 210 the shape of an end object based on the predicted porosity. For example, the shape prediction machine learning model may be a deep learning model to use a 3D point cloud as a data structure to connect and predict the shape (e.g., geometry) as designed and/or the shape (e.g., geometry) as fabricated. In some examples, the point-cloud-based deep learning model may be augmented with porosity volumetric data as additional attributes. In some examples of an online procedure, the apparatus may use a 3D object model and a predicted porosity of a precursor object as inputs to the shape prediction machine learning model to predict 210 the shape of an end object (e.g., geometry of an end object or objects of the build that are printed up to the current layer). The shape prediction may be a prediction of the end object(s) after sintering. In some examples of an offline procedure, the apparatus may use a 3D object model and a predicted porosity of a precursor object as inputs to the shape prediction machine learning model to predict 210 the shape of an end object (e.g., geometry of an end object or all end objects of the build). The shape prediction may be a prediction of the end object(s) after sintering.

In some examples, a simulation approach may be utilized to predict 210 the shape of the end object. For instance, a shape prediction engine may be a simulation engine based on physics of a sintering process as a viscoplastic material. In some examples, the predicted porosity (e.g., porosity distribution) may be applied to compute parameters of the constitutive equations of a viscoplastic model, which may influence the sintering simulation that may result in a simulated shape of the sintered end object.

The apparatus may determine 212 an expected porosity of the precursor object based on the predicted shape. An expected porosity is a porosity to lead to a target end object shape (e.g., geometry). For example, the expected porosity may lead to a target end object shape after the sintering process, and may be guided by the shape prediction (e.g., shape prediction machine learning model). Determining 212 the expected porosity may include comparing the predicted shape of an end object or end objects to the 3D object model or 3D object models. In some examples of an online procedure, the apparatus may utilize guidance (e.g., compensation generated) from the shape prediction machine learning model, and may compare the predicted shape of the end object (after sintering, for instance) to the 3D object model to generate the expected porosity of the precursor object for the object or objects printed so far (e.g., up to a current layer). For example, the shape prediction machine learning model may learn a relationship between precursor object porosity and end object shape (e.g., geometry). The learned relationship may be utilized as the guidance to generate the expected porosity. In some examples, a compensation model may be derived based on the shape prediction machine learning model. In some examples of an offline procedure, the apparatus may utilize guidance from the shape prediction machine learning model, and may compare the predicted shape of the end object (after sintering, for instance) to the 3D object model to generate the expected porosity of the precursor object for the object or objects (e.g., all objects in the build).

In some examples, determining 212 the expected porosity may be performed using a statistical approach. For example, a set of test structures may be manufactured through the printing and sintering processes. Porosity data of the test structures may be collected to develop a statistical model of porosity. The statistical model may describe the expected behavior of the processes (e.g., expected porosity). The operation of the printing and sintering processes (e.g., printer, oven, etc.) may be indicated by the expected behavior. In some examples, process control may bring each of the process attributes that deviates from the expected behavior into the expected behavior.

The apparatus may determine 214 an expected height map based on the expected porosity. An expected height map is a height map to lead to a target porosity. In some examples, determining 214 the expected height map may be guided by the porosity prediction (e.g., porosity prediction machine learning model). In some examples of an online procedure, the apparatus may utilize guidance (e.g., compensation generated) from the porosity prediction machine learning model and the expected porosity (of the precursor object, for instance) to generate the expected height map of a layer (e.g., a current layer). For example, the porosity prediction machine learning model may learn a relationship between a height map or maps and porosity. The learned relationship may be utilized as the guidance to generate the expected height map. In some examples, a compensation model may be derived based on the porosity prediction machine learning model. In some examples of an offline procedure, the apparatus may utilize guidance from the porosity prediction machine learning model and the expected porosity (of the precursor object, for instance) to generate the expected height map of a layer or layers (e.g., all layers in the build).

In some examples, determining 214 the expected height map may be performed using a statistical approach. For example, a set of test structures (e.g., precursor objects) may be manufactured through the printing process. Height map data of the test structures may be collected to develop a statistical model. The statistical model may describe the expected behavior of the process (e.g., expected height map). The operation of the printing process (e.g., printer, etc.) may be indicated by the expected behavior. In some examples, process control may bring each of the process attributes that deviates from the expected behavior into the expected behavior.

The apparatus may determine 216 an expected slice based on the expected height map. An expected slice is a slice to lead to a target height map. In some examples, determining 216 the expected slice may be guided by the height prediction (e.g., height prediction machine learning model). In some examples of an online procedure, the apparatus may utilize guidance (e.g., compensation generated) from the height prediction machine learning model and the expected height map to generate the expected slice. For example, the height prediction machine learning model may learn a relationship between a slice (and/or agent map) and a height map or maps. The learned relationship may be utilized as the guidance to generate the expected slice. In some examples, a compensation model may be derived based on the height prediction machine learning model. In some examples of an offline procedure, the apparatus may utilize guidance from the height prediction machine learning model and the expected height map(s) (e.g., the expected height maps of all of the layers) to generate the expected slice(s) (e.g., slices of all of the layers in the build).

In some examples, determining 216 the expected slice may be performed using a statistical approach. For example, a set of test structures may be manufactured through a printing process. Slice data of the test structures may be collected to develop a statistical model. The statistical model may describe the expected behavior of the process (e.g., expected slice). The operation of the printing process (e.g., printer, etc.) may be indicated by the expected behavior. In some examples, process control may bring each of the process attributes that deviates from the expected behavior into the expected behavior.

The apparatus may perform 218 compensation based on the expected slice(s). For instance, the apparatus may perform 218 online compensation and/or offline compensation. In some examples, the apparatus may perform online compensation based on the expected slice. For instance, the expected slice may be utilized to perform online compensation of a corresponding slice of the 3D object model. For example, the slice of the 3D object model may be adjusted online (e.g., during printing) in order to reduce or avoid potential deformation of the end object. In some examples, the apparatus may perform offline compensation based on the expected slice(s) (e.g., a set of expected slices). For instance, the expected slice(s) may be utilized to perform offline compensation of corresponding slice(s) of the 3D object model. For example, the slices of the 3D object model may be adjusted offline (e.g., before printing) in order to reduce or avoid potential deformation of the end object.

In some examples, predicting 206 a height map, predicting 208 a porosity, and/or predicting 210 a shape may be included in a forward pass for prediction. A forward pass is a procedure that accompanies and/or predicts operations in a forward order.

In some examples, determining 212 an expected porosity, determining 214 an expected height map, and determining 216 an expected slice may be included in a backward pass for compensation. A backward pass is a procedure that determines expected operations in a reverse order.

Examples of online procedures and offline procedures of the method 200 have been described. In some examples, an operation or operations of the method 200 may be performed repeatedly. For example, online and offline procedures may work together to enable better quality control. Before actual printing, for instance, the offline procedures may be performed to offline compensate the 3D object model or models (e.g., all objects of a build). During printing, the online procedures may be performed to compensate the geometry of each layer online before each layer is printed.

The apparatus may provide 220 the prediction(s) and/or compensation(s). In some examples, providing 220 the prediction(s) and/or compensation(s) may be performed as described in relation to FIG. 1. For instance, the apparatus may store the prediction(s) (e.g., predicted height map(s), predicted porosity(ies), and/or predicted shape(s) of the end object(s)) and/or the predicted compensation(s) (e.g., online compensation(s) and/or offline compensation(s)), may send the prediction(s) and/or compensation(s) to another device, and/or may present the prediction(s) and/or compensation(s) (on a display and/or in a user interface, for example). For instance, the apparatus may present (on a display and/or user interface, for example) the prediction(s) and/or compensation(s) with markers (e.g., colors, call-outs, emphasized points or lines, etc.) indicating where potential shape deformation may occur and/or where compensation(s) may be utilized to reduce or avoid potential shape deformation. In some examples, a deformation may be represented as a difference between and predicted end object and a corresponding 3D object model. In some examples, operation(s), function(s), and/or element(s) of the method 200 may be omitted and/or combined.

Figure 3:
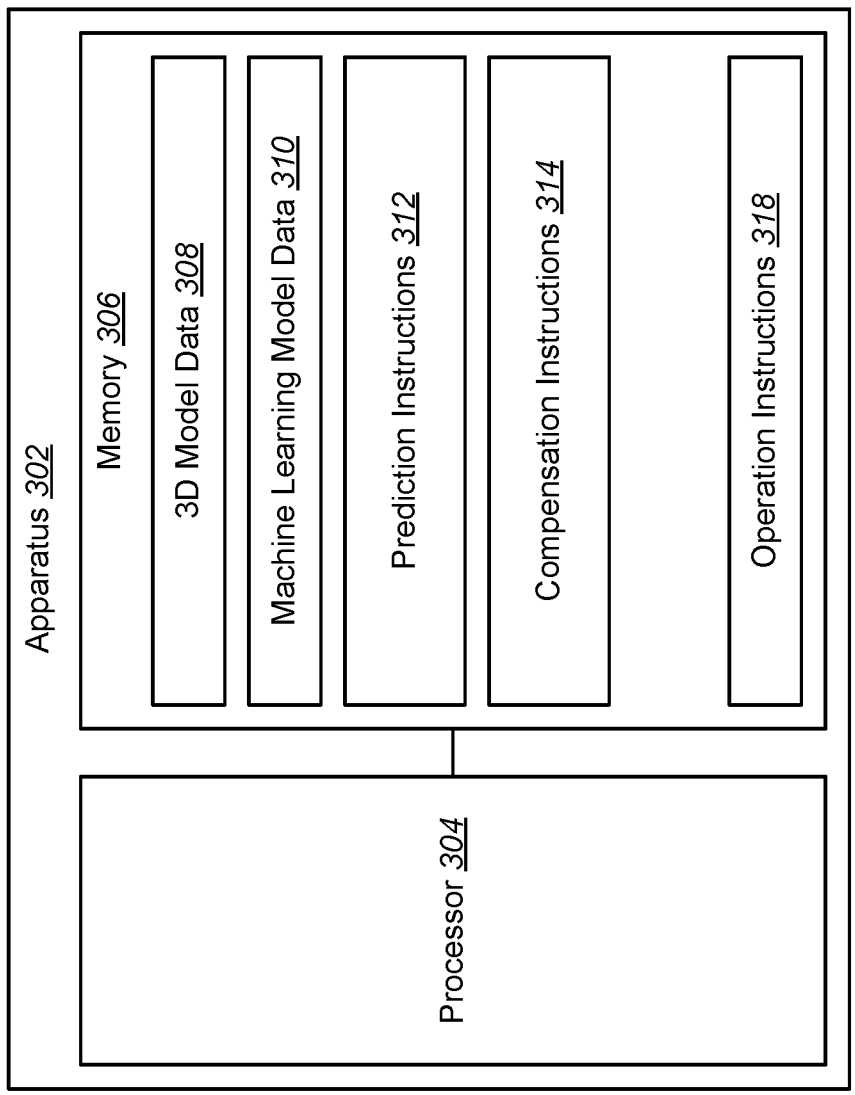
FIG. 3 is a block diagram of an example of an apparatus that may be used in predicting object deformation.

FIG. 3 is a block diagram of an example of an apparatus 302 that may be used in predicting object deformation. The apparatus 302 may be a computing device, such as a personal computer, a server computer, a printer, a 3D printer, a smartphone, a tablet computer, etc. The apparatus 302 may include and/or may be coupled to a processor 304, and/or a memory 306. The memory 306 may be in electronic communication with the processor 304. In some examples, the apparatus 302 may be in communication with (e.g., coupled to, have a communication link with) an additive manufacturing device (e.g., a 3D printing device). In some examples, the apparatus 302 may be an example of a 3D printing device. The apparatus 302 may include additional components (not shown) and/or some of the components described herein may be removed and/or modified without departing from the scope of this disclosure.

The processor 304 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 306. The processor 304 may fetch, decode, and/or execute instructions (e.g., prediction instructions 312) stored in the memory 306. Additionally or alternatively, the processor 304 may include an electronic circuit or circuits that include electronic components for performing a functionality or functionalities of the instructions (e.g., prediction instructions 312). In some examples, the processor 304 may be configured to perform one, some, or all of the functions, operations, elements, methods, etc., described in connection with one, some, or all of FIGS. 1-6.

The memory 306 may be any electronic, magnetic, optical, or other physical storage device that contains or stores electronic information (e.g., instructions and/or data). Thus, the memory 306 may be, for example, Random Access Memory (RAM), Electrically Erasable Programmable Read-Only Memory (EEPROM), a storage device, an optical disc, and the like. In some implementations, the memory 306 may be a non-transitory tangible machine-readable storage medium, where the term "non-transitory" does not encompass transitory propagating signals.

In some examples, the apparatus 302 may also include a data store (not shown) on which the processor 304 may store information. The data store may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the memory 306 may be included in the data store. Alternatively, the memory 306 may be separate from the data store. In some approaches, the data store may store similar instructions and/or data as that stored by the memory 306. For example, the data store may be non-volatile memory and the memory 306 may be volatile memory.

In some examples, the apparatus 302 may include an input/output interface (not shown) through which the processor 304 may communicate with an external device or devices (not shown), for instance, to receive and store the information pertaining to the objects for which deformation may be predicted. The input/output interface may include hardware and/or machine-readable instructions to enable the processor 304 to communicate with the external device or devices. The input/output interface may enable a wired or wireless connection to the external device or devices. In some examples, the input/output interface may further include a network interface card and/or may also include hardware and/or machine-readable instructions to enable the processor 304 to communicate with various input and/or output devices, such as a keyboard, a mouse, a display, another apparatus, electronic device, computing device, etc., through which a user may input instructions into the apparatus 302. In some examples, the apparatus 302 may receive 3D model data 308 from an external device or devices (e.g., computer, removable storage, network device, etc.).

In some examples, the memory 306 may store 3D model data 308. The 3D model data 308 may be generated by the apparatus 302 and/or received from another device. Some examples of 3D model data 308 include a 3D manufacturing format (3MF) file or files, a 3D computer-aided design (CAD) image, object shape data, mesh data, geometry data, etc. The 3D model data 308 may indicate the shape an object or objects. In some examples, the 3D model data 308 may indicate a packing of a build volume, or the apparatus 302 may arrange 3D object models represented by the 3D model data 308 into a packing of a build volume. In some examples, the 3D model data 308 may be utilized to obtain slices of a 3D model or models. For example, the apparatus 302 may slice the model or models to produce slices, which may be stored in the memory 306. In some examples, the 3D model data 308 may be utilized to obtain an agent map or agent maps of a 3D model or models. For example, the apparatus 302 may utilize the slices to determine agent maps (e.g., voxels or pixels where agent(s) are to be applied), which may be stored in the memory 306.

The memory 306 may store machine learning model data 310. The machine learning model data 310 may include data representing a machine learning model or machine learning models. For instance, the machine learning model data 310 may indicate layers, weights, and/or nodes of machine learning models. In some examples, the machine learning model data 310 may include data for a height prediction machine learning model, a porosity prediction machine learning model, and/or a shape prediction machine learning model. In some examples, the apparatus 302 may train the machine learning model(s) represented by the machine learning model data 310.

The memory 306 may store prediction instructions 312. In some examples, the processor 304 may execute the prediction instructions 312 to predict a map height or heights, a porosity or porosities, and/or a shape or shapes. In some examples, this may be accomplished as described in relation to FIG. 1 and/or FIG. 2. For instance, the processor 304 may utilize a height prediction machine learning model to predict a height map based on an agent map for metal printing.

In some examples, the processor 304 may utilize a porosity prediction machine learning model to predict a porosity of a precursor object based on the height map. For instance, this may be accomplished as described in relation to FIG. 1 and/or FIG. 2.

In some examples, the processor 304 may utilize a shape prediction machine learning model to predict a shape of an end object based on the porosity. For instance, this may be accomplished as described in relation to FIG. 2. In some examples, the processor 304 may perform online prediction and/or offline prediction of the height map prediction, porosity prediction, and/or shape prediction.

The memory 306 may store compensation instructions 314. In some examples, the processor 304 may execute the compensation instructions 314 to compensate for a potential deformation of the end object. For instance, the processor 304 may execute the compensation instructions 314 to determine a potential deformation by comparing (e.g., determining a difference between) the predicted shape of the end object and a corresponding 3D object model. The processor 304 may execute the compensation instructions 314 to determine expected porosity(ies), expected height map(s), and/or expected slice(s) as described in relation to FIG. 2. The processor 304 may execute the compensation instructions 314 to compensate a slice or slices and/or a 3D object model or models based on the expected porosity(ies), expected height map(s), and/or expected slice(s). In some examples, the processor 304 may perform online compensation and/or offline compensation.

The memory 306 may store operation instructions 318. In some examples, the processor 304 may execute the operation instructions 318 to perform an operation based on the prediction and/or compensation. For example, the processor 304 may present the predicted height map(s), prediction porosity(ies), predicted shape(s), potential deformation, expected porosity(ies), expected height map(s), expected slice(s), and/or compensation(s) on a display, may store the predicted height map(s), prediction porosity(ies), predicted shape(s), potential deformation, expected porosity(ies), expected height map(s), expected slice(s), and/or compensation(s) in the memory 306, and/or may send the predicted height map(s), prediction porosity(ies), predicted shape(s), potential deformation, expected porosity(ies), expected height map(s), expected slice(s), and/or compensation(s) to another device or devices. In some examples, the processor 304 may print the precursor object based on the predicted porosity. For example, the processor 304 may compensate for the potential object deformation (that is based on the predicted porosity) and may print the precursor object based on the compensation. For instance, the processor 304 may adjust the 3D model data 308 and/or printing instructions to compensate for the potential deformation in order to reduce actual deformation when the object is printed. For instance, the processor 304 may drive model setting based on a deformation-compensated 3D model that is based on the predicted height map(s), prediction porosity(ies), predicted shape(s), potential deformation, expected porosity(ies), expected height map(s), expected slice(s), and/or compensation(s).

Figure 4:
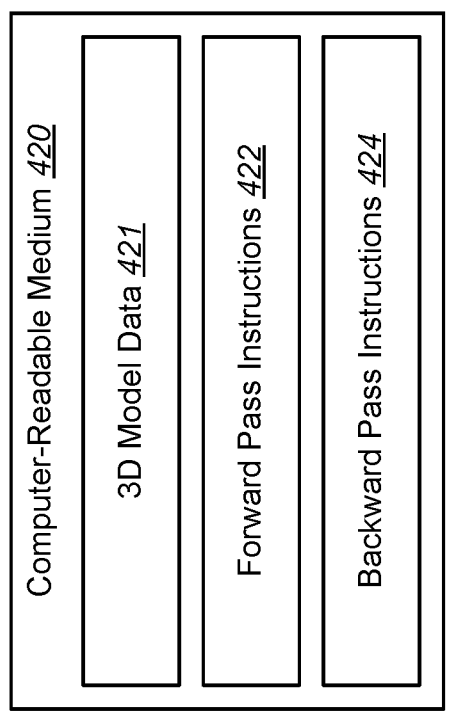
FIG. 4 is a block diagram illustrating an example of a computer-readable medium for porosity prediction.

FIG. 4 is a block diagram illustrating an example of a computer-readable medium 420 for porosity prediction. The computer-readable medium 420 may be a non-transitory, tangible computer-readable medium 420. The computer-readable medium 420 may be, for example, RAM, EEPROM, a storage device, an optical disc, and the like. In some examples, the computer-readable medium 420 may be volatile and/or non-volatile memory, such as DRAM, EEPROM, MRAM, PCRAM, memristor, flash memory, and the like. In some implementations, the memory 306 described in connection with FIG. 3 may be an example of the computer-readable medium 420 described in connection with FIG. 4.

The computer-readable medium 420 may include code (e.g., data and/or instructions, executable code, etc.). For example, the computer-readable medium 420 may include 3D model data 421, forward pass instructions 422, and/or backward pass instructions 424.

In some examples, the computer-readable medium 420 may store 3D model data 421. Some examples of 3D model data 421 include a 3D CAD file, a 3D mesh, etc. The 3D model data 421 may indicate the shape of a 3D object or 3D objects.

In some examples, the forward pass instructions 422 are code to cause a processor to perform a forward pass for metal printing that includes predicting a height map, predicting a porosity, and predicting a shape of an end object. In some examples, this may be accomplished as described in connection with FIG. 1, FIG. 2, and/or FIG. 3. For instance, the forward pass instructions 422 may be executed to predict height map(s), porosity(ies), and/or shape(s) using machine learning model(s). In some examples, the forward pass may be performed online and/or offline. For instance, the forward pass instructions 422 may be executed to perform an offline forward pass, and may be executed to perform an online forward pass.

In some examples, the backward pass instructions 424 are code to cause a processor to perform a backward pass that includes determining an expected porosity, determining an expected height map, and determining an expected slice of an end object. In some examples, this may be accomplished as described in connection with FIG. 2 and/or FIG. 3. For instance, the backward pass instructions 424 may be executed to determine expected porosity(s), expected height map(s), and/or expected slice(s) using machine learning model(s). In some examples, the backward pass may be performed online and/or offline. For instance, the backward pass instructions 424 may be executed to perform an offline backward pass, and may be executed to perform an online backward pass.

Figure 5:
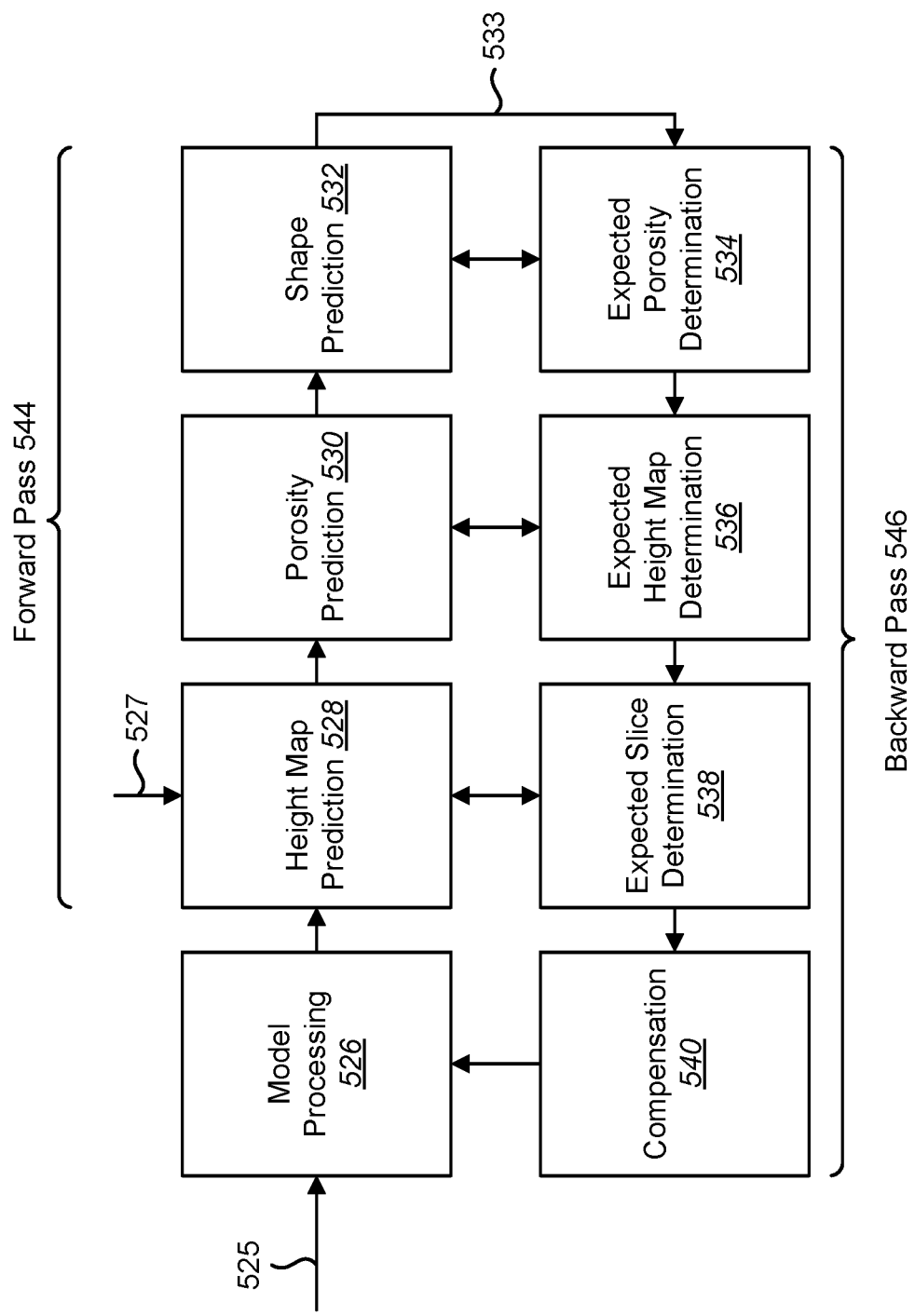
FIG. 5 is a block diagram illustrating an example of a structure for prediction and compensation.

FIG. 5 is a block diagram illustrating an example of a structure for prediction and compensation. For example, the structure illustrated in FIG. 5 may operate in accordance with some examples of the techniques described in relation to FIGS. 1, 2, 3, and/or 4. The structure includes functions that may be executed by a processor to perform forward pass 544 prediction and/or backward pass 546 compensation. The structure may include model processing 526, height map prediction 528, porosity prediction 530, shape prediction 532, expected porosity determination 534, expected height map determination 536, expected slice determination 538, and/or compensation 540. Forward pass 544 prediction may include height map prediction 528, porosity prediction 530, and/or shape prediction 532. Backward pass 546 compensation may include expected porosity determination 534, expected height map determination 536, expected slice determination 538, and/or compensation 540.

Model processing 526 may utilize a 3D object model or models 525 to produce slice(s) and/or agent map(s), which may be provided to height map prediction 528. Height map prediction 528 may predict height map(s) based on the slice(s) and/or agent map(s) for a layer or layers. In a case of online prediction, height map prediction 528 may utilize sensed height data 527, slice data, and/or agent map(s). In some examples, height map prediction 528 may utilize a height prediction machine learning model to produce the predicted height map(s). The predicted height map(s) may be provided to porosity prediction 530.

Porosity prediction 530 may predict porosity(ies) (of a precursor object or objects, for instance) based on the predicted height map(s). For example, porosity prediction 530 may utilize a porosity prediction machine learning model to produce the predicted porosity(ies). The predicted porosity(ies) may be provided to shape prediction 532.

Shape prediction 532 may predict shape(s) 533 (of an end object or objects after sintering, for instance) based on the predicted porosity(ies). For example, shape prediction 532 may utilize a shape prediction machine learning model to produce the predicted shape(s) 533. The predicted shape(s) 533 may be provided to expected porosity determination 534.

Expected porosity determination 534 may determine expected porosity(ies) (of a precursor object or objects, for instance) based on the predicted shape(s) 533. For example, expected porosity determination 534 may utilize guidance from a porosity prediction machine learning model to produce the expected porosity(ies). The expected porosity(ies) may be provided to expected height map determination 536.

Expected height map determination 536 may determine expected height map(s) based on the expected porosity(ies). For example, expected height map determination 536 may utilize guidance from a porosity prediction machine learning model to produce the expected height map(s). The expected height map(s) may be provided to expected slice determination 538.

Expected slice determination 538 may determine expected slice(s) based on the expected height map(s). For example, expected slice determination 538 may utilize guidance from a height prediction machine learning model to produce the expected slice(s). The expected slice(s) may be provided to compensation 540.

Compensation 540 may perform offline compensation and/or online compensation. For example, online compensation may include adjusting a slice or slices and/or an agent map or maps in model processing 526 to compensate for potential deformation. Offline compensation may include adjusting a 3D object model in model processing 526 to compensate for potential deformation.

Some examples of the techniques described herein may provide approaches to apply deep learning for end object shape (e.g., geometry) prediction and/or compensation. For example, end object shape after sintering may be predicted and the original object shape (e.g., geometry) may be compensated. Online compensation and/or offline compensation may be performed, which may serve for different applications and/or use-cases.

Figure 6:
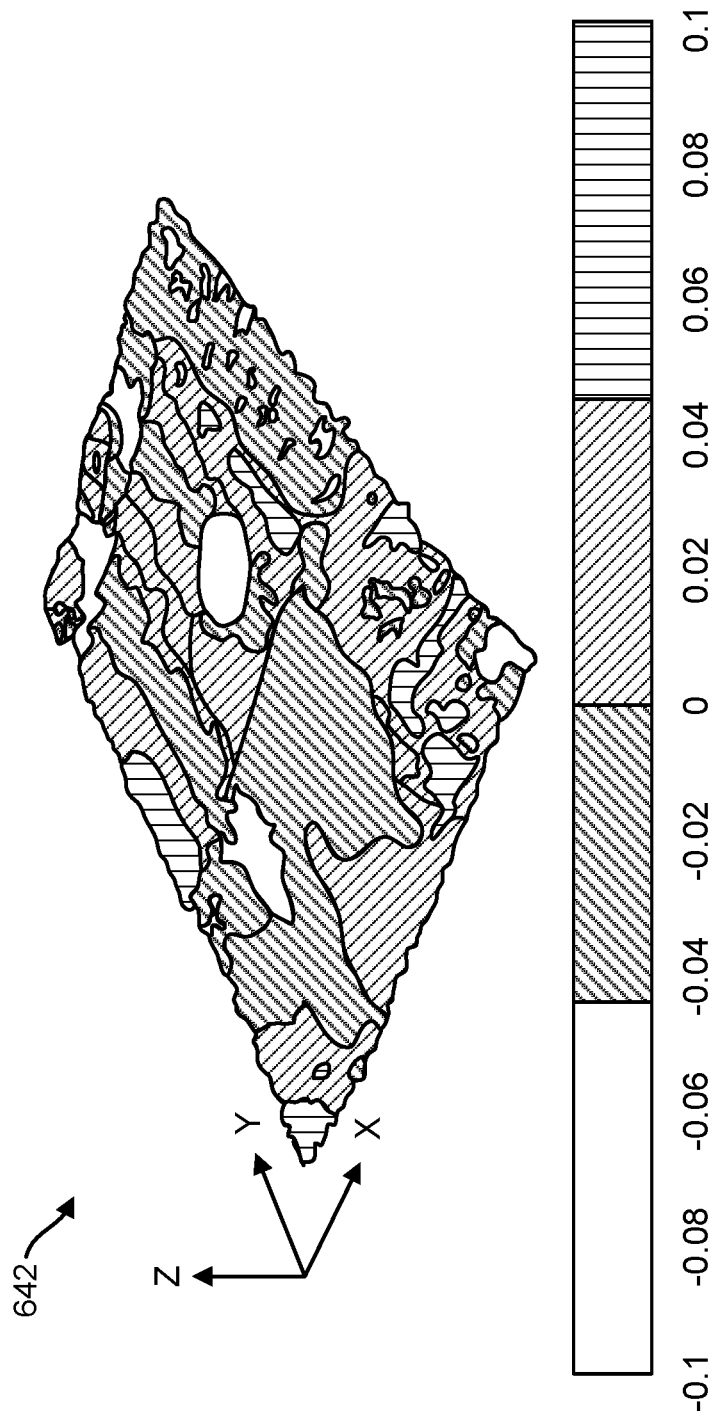
FIG. 6 is a diagram illustrating an example of sensed height data.

FIG. 6 is a diagram illustrating an example of sensed height data 642. As illustrated in FIG. 6, sensed height data 642 may indicate variation in height over a top layer of a build volume. The example of the sensed height data 642 is illustrated over an X dimension (e.g., width), a Y dimension (e.g., length), and a Z dimension (e.g., height). As described herein, the sensed height data may reflect precursor object porosity. In FIG. 6, the sensed height data 642 is illustrated as varying from a target height (represented as 0 on the illustrated scale). The illustrated scale for the Z dimension is in units of millimeters (mm).

Some examples of the techniques described herein may follow a loop from the height of each layer after printing, to the precursor object porosity, to the end object shape after sintering. Some deep-learning-based approaches may be utilized for metal printing (e.g., Metal Jet Fusion) to follow physical law and consider physical properties.

In some examples, a Conv-LSTM based deep learning architecture may be utilized that may predict the height map (1) after the layered printing process, and/or (2) after the powder spread. The architecture may be a quantitative model that provides better prediction and understanding of the two processes.

Some of the techniques described herein may be beneficial. For example, some of the techniques may provide a deep-learning-based framework to predict and compensate the end object shape in metal printing (e.g., Metal Jet Fusion) in both offline and online loops. Some of the techniques may provide a deep-learning-based approach that connects height and/or precursor object porosity with object shape (e.g., geometry). Some of the techniques may provide a deep learning approach that may learn a precursor object printing process and a powder spread process. The deep learning approach may be utilized to predict the height maps after the two processes separately.

While various examples of systems and methods are described herein, the systems and methods are not limited to the examples. Variations of the examples described herein may be implemented within the scope of the disclosure. For example, operations, functions, aspects, or elements of the examples described herein may be omitted or combined.

The invention claimed is:

1. A method, comprising:
   determining, by a processor coupled to a printer, a height map indicating one or more variations in a height of material in a build volume of material for metal printing based on one or more agent maps, wherein the one or more agent maps provide data indicating one or more locations for applying one or more agents, and wherein the printer is operable to manufacture an end object;
   determining, by the processor, a porosity of a precursor object based on the determined height map by determining a porosity for each voxel of the height map;
   determining by the processor, a predicted shape of the end object based on the porosity of the precursor object;
   determining, by the processor, one or more predicted shape deformation based on one or more differences between the predicted shape of the end object and a corresponding 3D object model;
   adjusting, by the processor, a 3D object model and one or more printing variables of the end object to reduce the one or more predicted shape deformations to a targeted amount; and
   controlling, by the processor, the printer to manufacture the end object based at least on the adjusted 3D object model and the adjusted one or more printing variables.

2. The method of claim 1, wherein determining the height map is based on a height prediction machine learning model.

3. The method of claim 1, wherein determining the height map is further based on sensed height data or slice data.

4. The method of claim 1, wherein determining the porosity is based on a porosity prediction machine learning model.

5. The method of claim 1, wherein determining the predicted shape is based on a shape prediction machine learning model.

6. The method of claim 1, further comprising determining an expected porosity of the precursor object based on the predicted shape.

7. The method of claim 6, further comprising determining an expected height map based on the expected porosity.

8. The method of claim 7, further comprising determining an expected slice based on the expected height map.

9. The method of claim 8, further comprising performing online compensation based on the expected slice.

10. The method of claim 8, further comprising performing offline compensation based on a set of expected slices.

* * * * *